United States Patent [19]
McGary et al.

[11] Patent Number: 5,442,697
[45] Date of Patent: Aug. 15, 1995

[54] DIGITAL DATA LOOPBACK DEVICE

[75] Inventors: John S. McGary, Huntsville; Norman R. Harris, Madison, both of Ala.

[73] Assignee: Adtran Corporation, Huntsville, Ala.

[21] Appl. No.: 159,788

[22] Filed: Nov. 29, 1993

[51] Int. Cl.⁶ .................................................. H04B 3/46
[52] U.S. Cl. ............................. 379/399; 379/5; 379/6; 379/413; 370/13; 370/14; 370/15
[58] Field of Search ............ 379/399, 5, 6, 413, 379/22; 370/13, 14, 15

[56] References Cited
U.S. PATENT DOCUMENTS

| | | | |
|---|---|---|---|
| 4,766,594 | 8/1988 | Ogawa et al. | 379/5 |
| 4,984,250 | 1/1991 | Koyama | 375/36 |
| 4,984,262 | 1/1991 | Kumozaki et al. | 379/5 |
| 5,224,149 | 6/1993 | Garcia | 379/5 |

*Primary Examiner*—James L. Dwyer
*Assistant Examiner*—Jacques M. Saint-Surin
*Attorney, Agent, or Firm*—Charles E. Wands

[57] ABSTRACT

The need to equip a digital data service termination with the ability to decode digital loopback commands is obviated by a relatively simple hardware modification of a four wire telephone circuit connecting an office channel unit and customer premises equipment. In addition, the signal processing and test control firmware of the office channel unit equipment (OCU DP) is modified so as to realize a simplified circuit configuration for performing loopback testing of the four wire circuit. The hardware modification of the four wire circuit connecting the office channel unit and the customer premises involves the use of a sealing current-dependent relay circuit that responds to respectively different sealing current flow states: normally; interrupted; and reversed, as converted by the OCU DP. The present invention is particularly useful in subscriber loop circuits that are less than 10,000 feet in length, whereby the need for additional amplifier and noise reduction components is obviated.

39 Claims, 5 Drawing Sheets

DIGITAL DATA LOOPBACK DEVICE

FIELD OF THE INVENTION

The present invention relates in general to communication systems, and is particularly directed to an arrangement for facilitating the testing of a wire circuit connecting a central office of a digital data network of the Regional Bell Operating Companies (RBOCs) and a subscriber, especially an arrangement for connecting an office channel unit dataport (OCU DP) and downstream customer premises equipment (CPE).

BACKGROUND OF THE INVENTION

Continuing improvements in digital communication technology have made it increasingly attractive for the RBOC's to offer digital transmission service to their customers as a cost effective and accurate method of sending and receiving data from facilities, such as businesses, homes, hotels, dormitories, etc. One such service is the digital data service (DDS), which uses time division multiplexers (TDM) for multiplexing high speed serial data into a series of time increments, each providing a data stream having a transmission rate of, for example, up to 64,000 bits per second.

The DDS subscriber is connected to the network through an office channel unit (OCU), or office channel unit data port (OCU DP) using a four wire metallic circuit consisting of two conductor pairs, each pair being associated with a respective direction of transmission, hereinafter referred to as 'downstream'—for transmissions from the office channel unit to the subscriber central office, and 'upstream'—for transmissions from the subscriber to the office channel unit. (For a detailed description of office channel units (OCUs) and a DDS in particular, attention may be directed to literature published on the subject, such as the November 1982 issue of the Bell Technical Journal.)

A problem in providing digital data services is the need to install in the link downstream of the channel unit special equipment that is capable of interpreting digitally formatted (test) command signals (e.g. digital loopback command signals) in order allow the service provider (RBOC) to properly test the service to the circuit remotely, without subscriber involvement. Such test interface devices, commonly known as digital data station terminations, or DDSTs, are located at the subscriber end of the loop. The DDST contains active electronic circuits which receive signals to be exchanged between the central office and the customer's equipment. Upon detecting and interpreting digital command signals, the DDST is operative to cause the signals to be returned, or 'looped back' to the sender for test purposes. Such loopback capability allows the central office to send known digital signal patterns, and receive these same patterns via the loopback or return path, so that the accuracy of the transmission service may be determined. The test carried out involves bit error rate testing (BERT) and provides the RBOC with performance information to insure that the service to the customer is satisfactory.

Because the physical length of a subscriber loop may be quite substantial (e.g. up to 60,000 feet), the signals conveyed over the loop are subject to a significant amount of degradation, resulting in distortion and/or loss of information. As a consequence, to successfully carry out loopback testing for such long line links, the subscriber loop must be modified to accommodate the insertion of additional complex circuitry which performs amplification and distortion-removal prior to retransmission of the digitally encoded test patterns back to the central office.

In order to initiate the testing of a digital services link, a test system (such as a "SARTS" manufactured by AT&T), that is remote from the central office, transmits prescribed digital command signals associated with a loopback function. At the central office, these digital command signals are passed on by the office channel unit to the individual downstream circuits via the telephone links in which the circuits are installed. Normally, a device (e.g. an OCU DP) receiving a loopback command from the test facility causes the current within the four wire loop to be reversed, with the current reversal being sensed by various downstream communication devices.

For example, when a loopback command code pattern is received by an office channel unit from the test facility, the OCU DP customarily operates a double pole-double throw relay, the contacts of which are coupled in circuit with the four wire telephone link, so as to cause reversal of the direction of flow of sealing current that is continuously supplied over the four wire link between the office channel unit and a (downstream) DDST. This reversal of sealing current, in turn, is sensed by the downstream DDST, which then disconnects the four wire loop from the customer equipment, and loops the digital command pattern, that has been forwarded down the link to the DDST, back up the upstream wire pair to the office channel unit for comparative analysis.

Thereafter, a second digital command code pattern is forwarded down the link to the DDST. The digital data processing circuitry within the DDST is configured to interpret this second command code and reconnect the four wire link to the customer's equipment, thereby passing the reversed current condition on to the customer. By convention, the customer's device interprets the reversed current condition as a loopback instruction, so that the data being conveyed over the downstream portion of the link is now looped back at the customer's equipment, whereby the functionality of the link may be tested all the way to the customer's equipment.

In summary, in a conventional digital services loopback testing scheme, the signal processing capability of the DDST must enable it to do the following. First, it must detect reversal of loop current and disconnect the customer from the link. Secondly, it must regenerate the digital data pattern, in order to overcome line losses and distortions, and then retransmit the received digital command signal back up the return or upstream portion of the link to the central office channel unit. The DDST itself then looks for a prescribed digital pattern from the channel unit and, upon detection of this digital pattern, the DDST reconnects the signal path back to the customer. The DDST also continues to monitor the direction of the loop current; when the direction of loop current flow returns to normal, the DDST returns to the normal data mode. The office channel unit must also detect in-band digital command signals from the test system and relay these digital command signals, as well as perform sealing current reversal as instructed by a command.

SUMMARY OF THE INVENTION

In accordance with the present invention, the above described complexities associated with the need to equip the DDST with the capability to perform interpretation of digital loopback commands are significantly reduced by means of a relatively simple hardware modification of the four wire circuit connecting the office channel unit and the customer premises, and a relatively straightforward enhancement of the signal processing and test control firmware of the office channel unit equipment (OCU DP), thereby realizing a simplified circuit configuration for performing loopback testing of the four wire circuit.

The modification of the signal processing mechanism embodied within the OCU DP's firmware involves enabling the OCU DP to perform all interpretation of test facility loopback commands, so that the (downstream) DDST is relieved of this burden, and thereby considerably simplifying its signal processing functionality. Specifically, the firmware in the OCU DP is modified so that the OCU DP effectively converts incoming digital test (loopback) command patterns from the test facility into three respective loop (sealing) current flow states as follows: 1sealing current normal; 2-sealing current reversed; and 3-sealing current off.

The hardware modification of the four wire circuit connecting the office channel unit and the customer premises involves the insertion of a loopback unit in the four wire circuit containing a sealing current-dependent relay circuit that responds to the three sealing current flow states as converted by the OCU DP as follows. First, sealing current flow (in either the 1-normal or 2-reverse directions) causes the relay to provide a signal flow path over the four wire loop to the customer site. However, for the third condition (sealing current off), the loopback unit is operative to disconnect the signal flow path to the customer, and instead loop the signal flow path through a set of cross-coupling switch contacts of the relay unit back to the central office for loopback testing.

In a preferred application, the invention is intended to be used with loops having a two-way (round trip) single loss equal to the receive sensitivity of the office channel unit. By equipping the office channel unit with the ability to translate test facility-sourced digital command patterns into sealing current flow states and eliminating the requirement that DDST equipment downstream of the office channel unit monitor and interpret in-band digital commands, the complexity of the remote loopback device (DDST) is considerably reduced, so that the remote loopback device can be realized with a few passive circuits, thereby decreasing the size and cost of the equipment.

The reduced hardware complexity modification of the four wire circuit in accordance with the invention comprises a sealing current-responsive relay circuit that is coupled with each of the downstream and upstream telephone line pairs, and a third, auxiliary telephone line pair coupled to the relay circuit. At the office end of the four-wire link, the normally provided double-pole, double-throw relay, through which sealing current would otherwise be continuously applied to the four wire link, is replaced by a pair of sealing current control relays, one for the downstream link and one for the upstream link, so as to not only enable the direction of sealing current flow to be controlled, as in a conventional loopback arrangement, but also to allow sealing current to be turned-off. Each of these replacement sealing current control relays is coupled to receive a respective control signal from the microcontroller within the OCU-DP.

In the normal signal pass-through mode (i.e. in the absence of a loopback-associated digital command being received by the OCU DP from the test facility), the contacts of the two sealing current control relays complete circuit connections between a supply of sealing current (of either a positive or negative polarity) and each of the first and second telephone line pairs, so that sealing current flows through the four wire loop. This sealing current is coupled to a sealing current-responsive relay coil within the controllable relay circuit, so that the relay coil is energized, and thereby places its relay contacts in a first pass-through state, to provide connectivity through each of the downstream and upstream telephone line pairs between the office and customer sites.

In the absence of the flow of sealing current, the relay coil is operative to interrupt, or sever, connectivity through each of the telephone line pairs between the office and customer sites, and to cross-couple the two telephone line pairs to the third telephone line pair, thereby providing a loopback path for the office site from the downstream line pair to the upstream telephone line pair. The sealing current-responsive relay circuit is also operative to reinstate connectivity through each of the downstream and upstream telephone line pairs, in response to the reapplication of sealing current via the two sealing current control relays.

The cross-coupling components of the sealing current-responsive relay circuit preferably include a full wave rectifier coupled in circuit with the one of the two telephone line pairs and a current limiter coupled between the full wave rectifier circuit and a relay coil circuit. In addition, a surge protection circuit is coupled in circuit with the two telephone line pairs, and a Zener diode is coupled in circuit with the relay coil, so as to provide a path for excess sealing current and prevent overdriving the relay contacts. The current limiter is coupled in circuit with the relay coil and the Zener diode so as to protect the Zener diode against excess power dissipation.

As will be described, the present invention has particular utility in metropolitan areas, where many of the subscriber circuits are provided over wire loops that are less than 10,000 feet in length, thereby circumventing the need for additional amplifier and noise reduction components.

DETAILED DESCRIPTION

Figure 1:
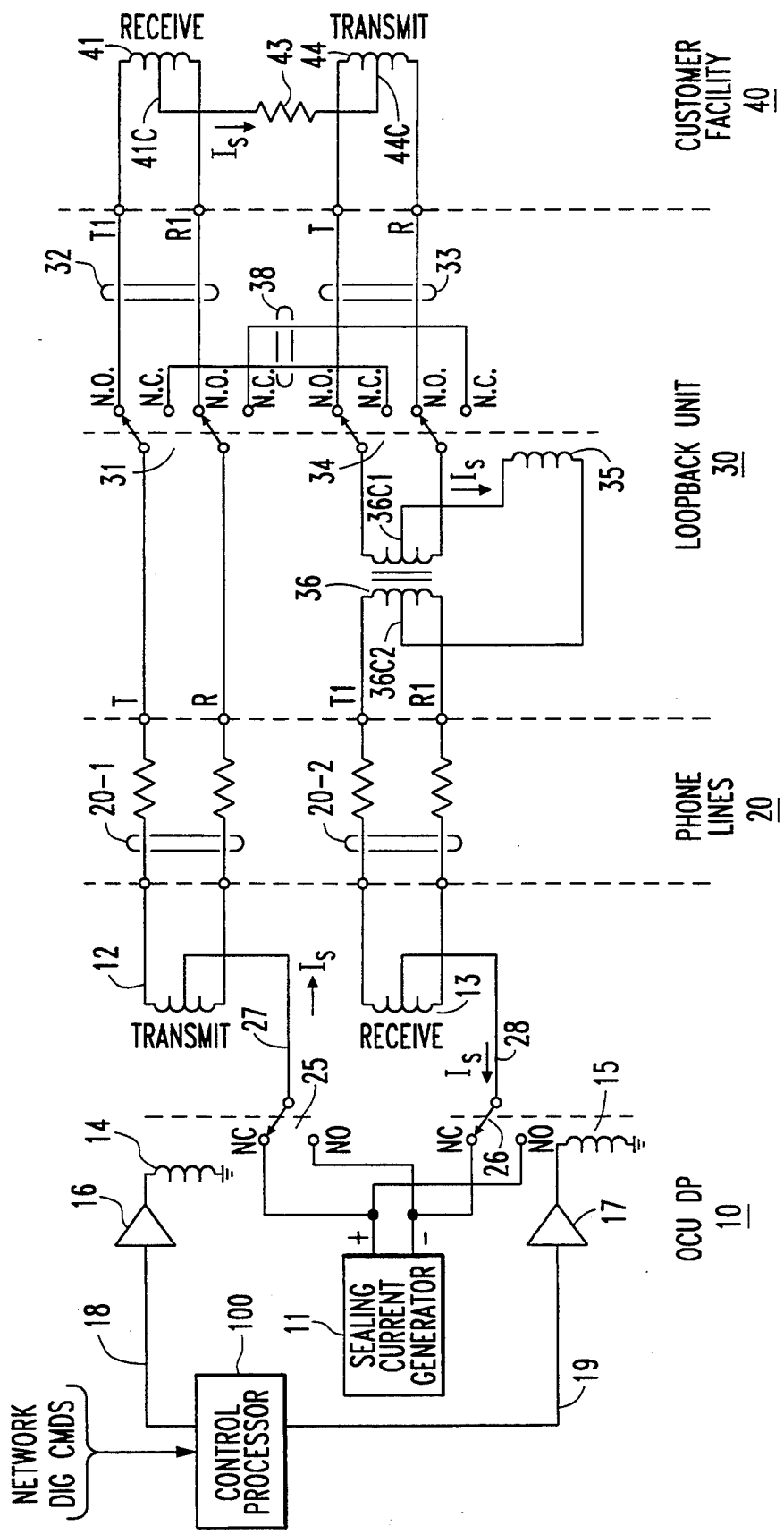
FIG. 1 is a simplified diagrammatic illustration of a DDS network showing the manner in which an OCU DP, phone lines, loopback unit, and customer facility are interfaced with one another.

Before describing in detail the particular improved loopback arrangement in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring now to FIG. 1, a simplified diagrammatic illustration of a DDS network is shown as comprising an office channel unit data port (OCU DP) 10 at the upstream or network-office end of a four wire telephone link 20, a loopback unit 30 installed in link 20 at a selected location of link 20, and a customer facility 40 at a downstream end of the link. As a non-limitative example, office channel unit data port 10 may comprise an OCU-DP Model No. 1104005L9, manufactured by Adtran Corp., Huntsville, Ala. For purposes of simplifying the drawing, only that portion of the hardware of OCU DP 10 that has been modified to incorporate the novel loopback functionality of the present invention is shown in FIG. 1. Also, the enhancements to the test control firmware through which the channel unit's control processor establishes the above described sealing current conditions for controlling the operation of the loopback unit 30 are set forth in the flow charts of FIGS. 4 and 5, to be described below.

As shown in FIG. 1, in place of a normally provided double-pole, double-throw relay through which sealing current would otherwise be continuously applied to four wire link 20, the present invention employs a pair of sealing current control relays 14 and 15, relay 14 being associated with a first, or downstream, portion 20-1 of the link, and relay 15 being associated with a second, or upstream, portion 20-2 of the link. As will be described, the use of separate sealing current control relays 14 and 15 not only enables the direction of sealing current flow through the four wire loop to be controlled, as in a conventional arrangement, but also provides a mechanism for turning the sealing current off.

As shown, each of sealing current control relays 14 and 15 has a relay coil coupled to the output of a respective amplifier 16 and 17, inputs to which are coupled via links 18 and 19, respectively, to control output ports of a control processor 100 within the OCU DP 10. As explained briefly above, and as will be detailed below, control processor 100 provides respective control signals on control links 18 and 19 in accordance with the operational mode of the four wire circuit, as specified by digital command signals received by the test facility. For purposes of the invention, the operational mode is associated with one of the three loop (sealing) current flow states itemized above as: 1-sealing current normal; 2-sealing current reversed; and 3-sealing current off.

The sealing current generator itself includes a source 11 of sealing current (e.g. a ±48 V supply with attendant output port coupling resistors) which is connected to the center taps of phone line transformer secondary windings 12 and 13 through the switchable contacts 25 and 26 of sealing current control relays 14, 15 and center tap connection lines 27 and 28. (The primary windings of the phone line transformers through which communication signals are coupled with lines 20 are not shown in FIG. 1 in order to simplify the drawing.)

In the normal mode of operation, sealing current $I_s$ of either polarity flows in simplex mode from sealing current generator 11 through relay contacts 25, 26 and links 27, 28 to center taps of interface transformer secondary windings 12 and 13, respectively. For positive sealing current flow, current flows from the (+) port output of current generator 11 through from the normally closed (NC) of relay contact 25 and link 27 to the center tap of interface transformer secondary winding 12 and through the downstream T-R pair 20-1 of four wire link 20 to loopback unit 30. (As noted previously, it is intended that loopback unit 30 is installed with only those lines having a round trip loss of less than 45 dB, so that there is no problem of performance degradation due to the insertion loss of the unit.) Within loopback unit 30, downstream wire pair 20-1 is coupled through normally open (NO) relay contacts 31 of a loopback relay 35 to a phone line pair 32 and to the primary winding of a receive transformer 41 of equipment at the customer's facility 40.

At the customer facility 40, the sealing current is recovered from the center tap 41C of the primary winding of receive transformer 41 and is coupled through a current detector resistor 43 and back to the center tap 44C of the secondary winding of a transmit transformer 44 of the customer's equipment. The sealing current $I_s$ then follows a similar return path upstream through phone line pair 33 and the normally open contacts NO of relay contacts 34 of a loopback relay 35, and also through a coupling transformer 36, where sealing current is again recovered from its center taps 36C1 and 36C2. Namely, in the upstream or return current flow direction, sealing current flows from center tap 36C1, through loopback relay coil 35 and back through the center tap 36C2 of coupling transformer 36. It then returns to OCU DP 10 through upstream phone line pair 20-2 and the interface secondary winding transformer 13, link 28 and the normally closed relay contacts 26 of control relay 15 to the negative (−) terminal of sealing current source 11.

As described above, in the normal pass-through mode of operation, control relays 14 and 15 have their associated contacts 25, 26 in the illustrated normally closed (NC) contact positions 25NC and 26NC, so that sealing current flows from the positive (+) terminal of sealing current generator 11 through the four wire loop 20 and is sinked to the negative terminal (−) of generator 11. To reverse the direction of the flow of sealing current control relays 14 and 15, control signals are coupled from control processor 100 over control links 18 and 19, causing each of relays 14 and 15 to be operated, whereby relay contacts 25 and 26 switch to their normally open positions 25NO and 26NO. As long as sealing current is flowing, regardless of its direction, loopback relay 35 is energized, so that relay contacts 31 and 34 of relay coil 35 are maintained in the illustrated normally open position and data may be transmitted over the four wire loop between the network and the equipment at the customer's facility 40.

Whenever a remote test facility sends a loopback test command to the office channel unit, the received digital code sequence representative of the command is decoded by control processor 100 in the OCU DP 10 and output therefrom in the form of control signals, which set the logical states of control lines 18 and 19 to the coils of sealing current control relays 14 and 15.

More particularly, when a loopback command applicable to the loopback device is detected, control processor 100 invokes the loopback by applying a control signal over link 18 to operate control relay 14, so that its relay contact 25 switches from its normally closed position 25NC to its normally open position 25NO; also, at this time the state of line 19 is such that control relay 15 places its relay contact 26 in normally closed position 26NC. Since both center tap lines 27 and 28 of transformer secondary windings 12 and 13 are connected to the same sealing current port (e.g. its negative (−) terminal) of sealing current generator 11, the flow of sealing current is interrupted (i.e. set to 0 milliamps).

With no sealing current flowing through the four wire loop 20, sealing current-responsive relay coil 35 is de-energized, thereby causing its relay contacts 31, 34 to assume their normally closed (NC) positions, breaking the connection to the customer premises 40 and, instead, coupling link pair 20-1 to cross-coupling link pair 38 and directing the digital code pattern transmitted on link pair 20-1 back through coupling transformer 36 and upstream pair 20-2 to OCU-DP 10.

To terminate the loopback mode and cause a reapplication of sealing current to the loop, control processor 100 changes the state of one of control lines 18 and 19, so that one of relays 14 and 15 switches the position of its contacts 25 or 26, and thereby provides a sealing current flow path through the four wire loop (and relay coil 35) between opposite polarity terminals (+) and (−) of generator 11. With loopback relay coil being re-energized, its relay contacts 31, 34 return to their normally open position, as shown, allowing data to flow normally through the four wire phone link to customer facility 40.

Figure 2:
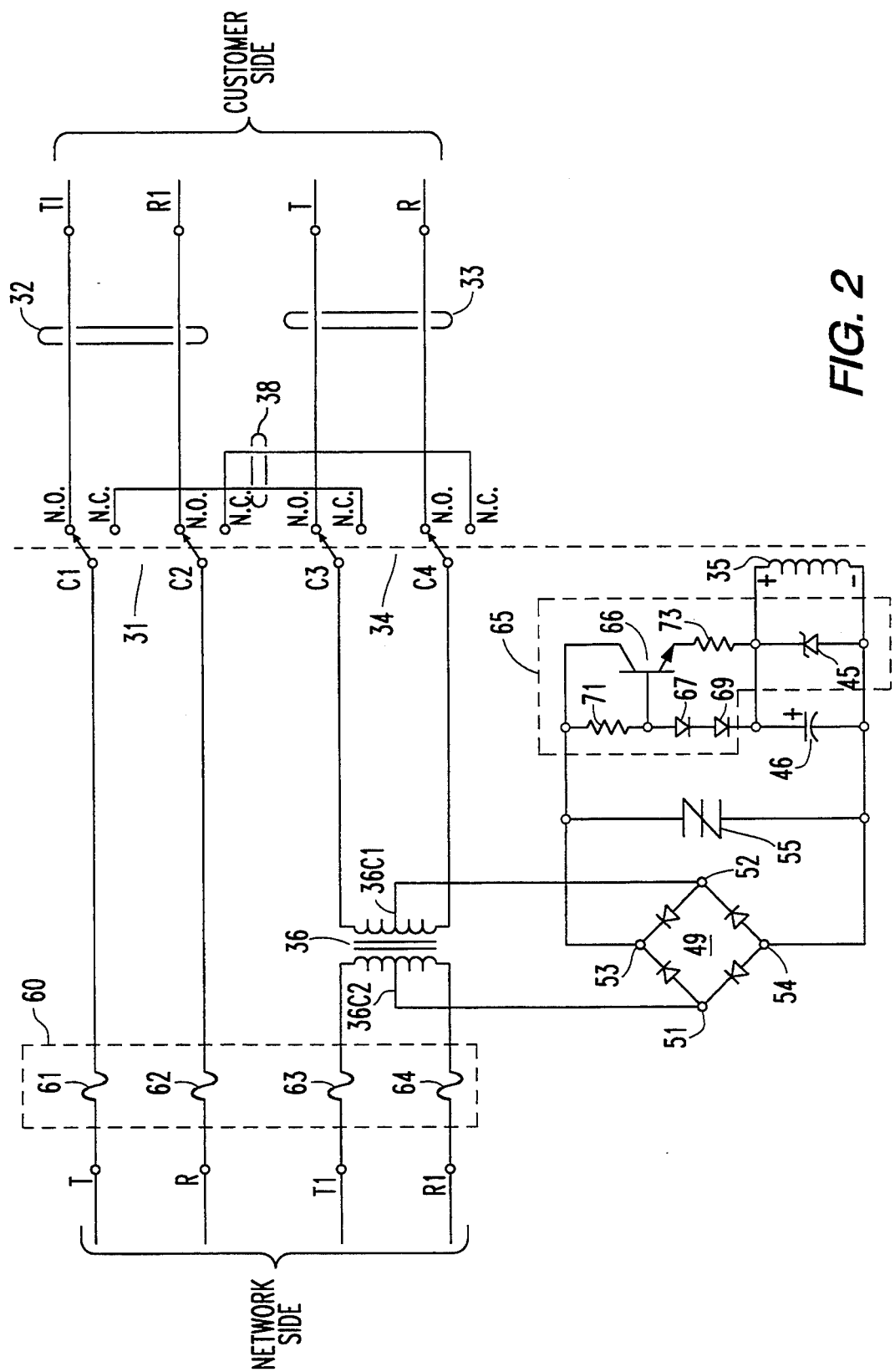
FIG. 2 is a detailed schematic diagram of a first embodiment of loopback unit employed in the network of FIG. 1, detailing power cross and lightning protection circuitry.

A first practical embodiment of loopback unit 30 is shown schematically in FIG. 2. The circuitry is functionally divided into two areas: 1-loopback; and 2-protection. The loopback function is provided by loopback relay 35, coupling transformer 36, a full wave bridge rectifier 49, a storage capacitor 46, and a Zener diode 45. A lightning protection circuit 60 comprised of four in-line fuses 61, 62, 63, 64 is coupled in circuit with line pairs 20-1 and 20-2. Respective input terminals 51, 52 of bridge rectifier 49 are coupled to center taps 36C1 and 36C2 of coupling transformer 36. Respective output terminals 53, 54 of bridge rectifier 49 are coupled across an over-voltage sidactor 55, and to a current limit circuit 65 comprised of a transistor 66, a pair of diodes 67, 69 and resistors 71, 73.

As can be seen from the circuit diagram of FIG. 2, for the normal mode of operation, described above, digital data intended for the customer site will pass through the line termination at the customer premises 40 without signal loss, and return data from the customer interface will pass through the coupling transformer 36 with minimum signal attenuation. Sealing current is obtained from the center taps 36C1, 36C2 of coupling transformer 36 and rectified by diode bridge 49. The sealing current flows through the current limit circuit 65 into loopback relay coil 35. When coil 35 is energized, its relay contacts 31, 34 are in their normally open (N.O.) position, as shown. The sealing current is rectified by diode bridge 49 so as to allow reversal of the sealing current without changing the data path through loopback unit 30.

When the sealing current is forced to 0 milliamps or turned off, in order to invoke the loopback function, as described above, sealing current-responsive relay coil 35 coil is de-energized, so that relay contacts 31, 34 transition to their normally closed (N.C.) positions. With relay contacts 31, 34 in their normally closed positions (loopback state), the digital test data transmitted from the network is looped back through cross-coupled loop pair 38 and upstream link 20-2 to OCU DP 10. Zener diode 45 provides a path for excess sealing current, to prevent over-driving relay coil 35. Storage capacitor 4.3 supplies a temporary source of sealing current when relay contacts 31, 34 transition from their N.C. position to the N.O. position. During relay contact transition time, the sealing current path is momentarily interrupted.

Power cross and lightning protection is furnished by in line fuses 61–64, current limit circuit 65, and sidactor 55. Current limit circuit 65 protects Zener diode 45 against excess power dissipation during a power cross condition. The circuitry is designed for standoff voltages of less than 200 volts. For voltages in excess of 200 volts sidactor 55 will engage and limit the voltage to less than 5 volts. Sidactor 55 will remain in the conductive state as long as a small amount of holding current is present.

During the conductive state, the current is limited by the source impedance of the power cross voltage generator. For higher level power cross tests, the circuitry is protected by the opening of the in line fuses 61–64. Lightning protection is provided in the same manner as power cross protection. The energy level in the lightning impulse wave front is absorbed by coupling transformer 36 and will not damage the components.

Figure 3:
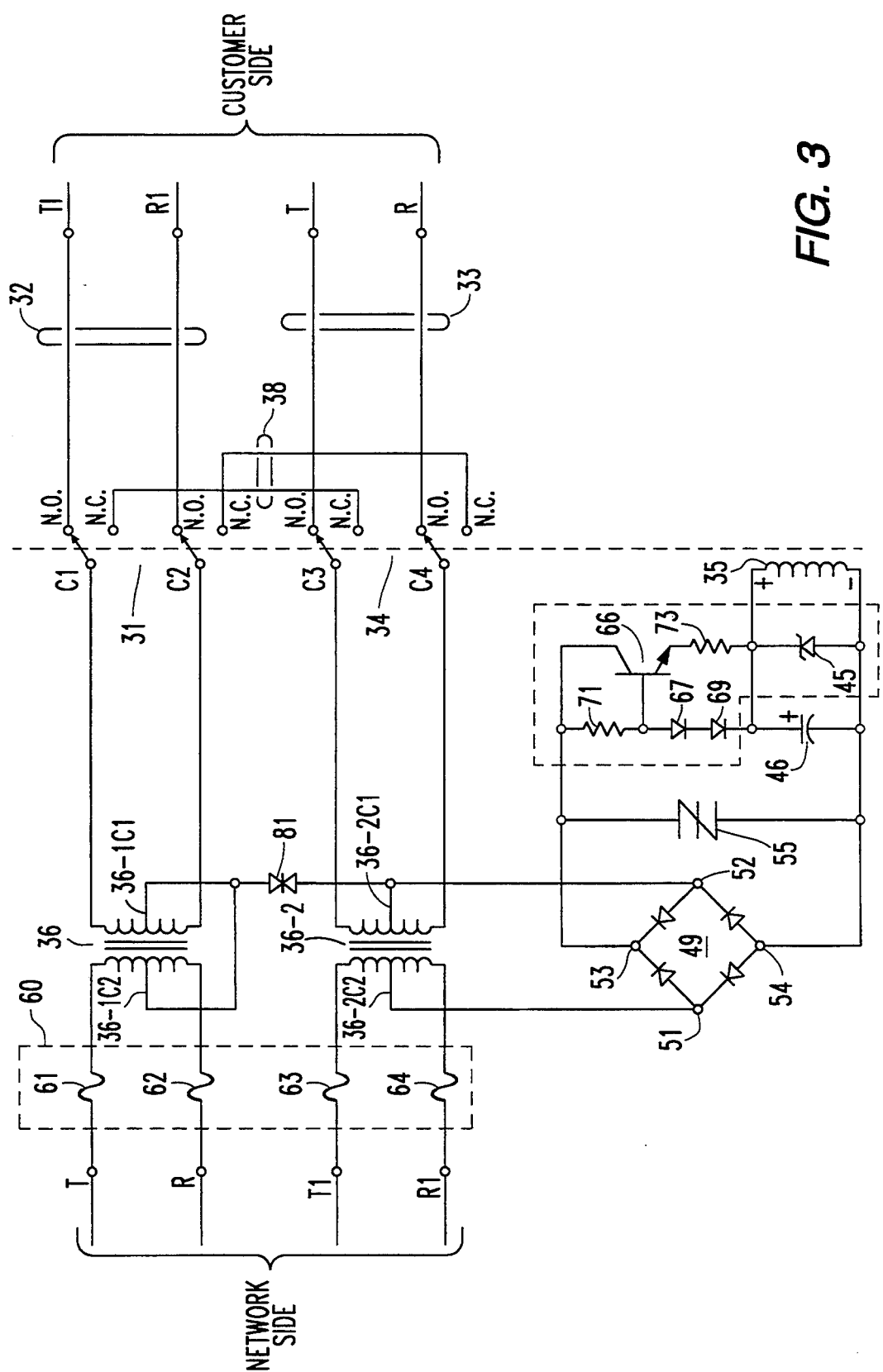
FIG. 3 is a second embodiment of the loopback unit having additional transformer components to prevent loopback upon removal of the customer's equipment from the loop.

A second practical embodiment of loopback unit 30 is shown schematically in FIG. 3. This embodiment includes two additional components which prevent sealing current from being interrupted with the removal of the customer side equipment. Some DDS applications employing multi-drop networks cannot function with a portion of,the network in loopback mode. Inadvertent disconnection of a customer's equipment should not break the sealing current path.

To prevent this from happening, in the embodiment of FIG. 3, coupling transformer 36 is formed as a pair of coupling transformer sections 36-1, 36-2. The first coupling transformer section 36-1 is coupled in circuit with line pair 20-1, and the second coupling transformer section 36-2 is coupled in circuit with line pair 20-2, as shown. In addition, a bidirectional Zener diode 81 is coupled to the commonly connected center taps 36-1C1 and 36-1C2 of coupling transformer section 36-1 and center tap 36-2C1 of coupling transformer 36-2, to provide an alternate sealing current path with the customer side terminals opened.

Figure 4:
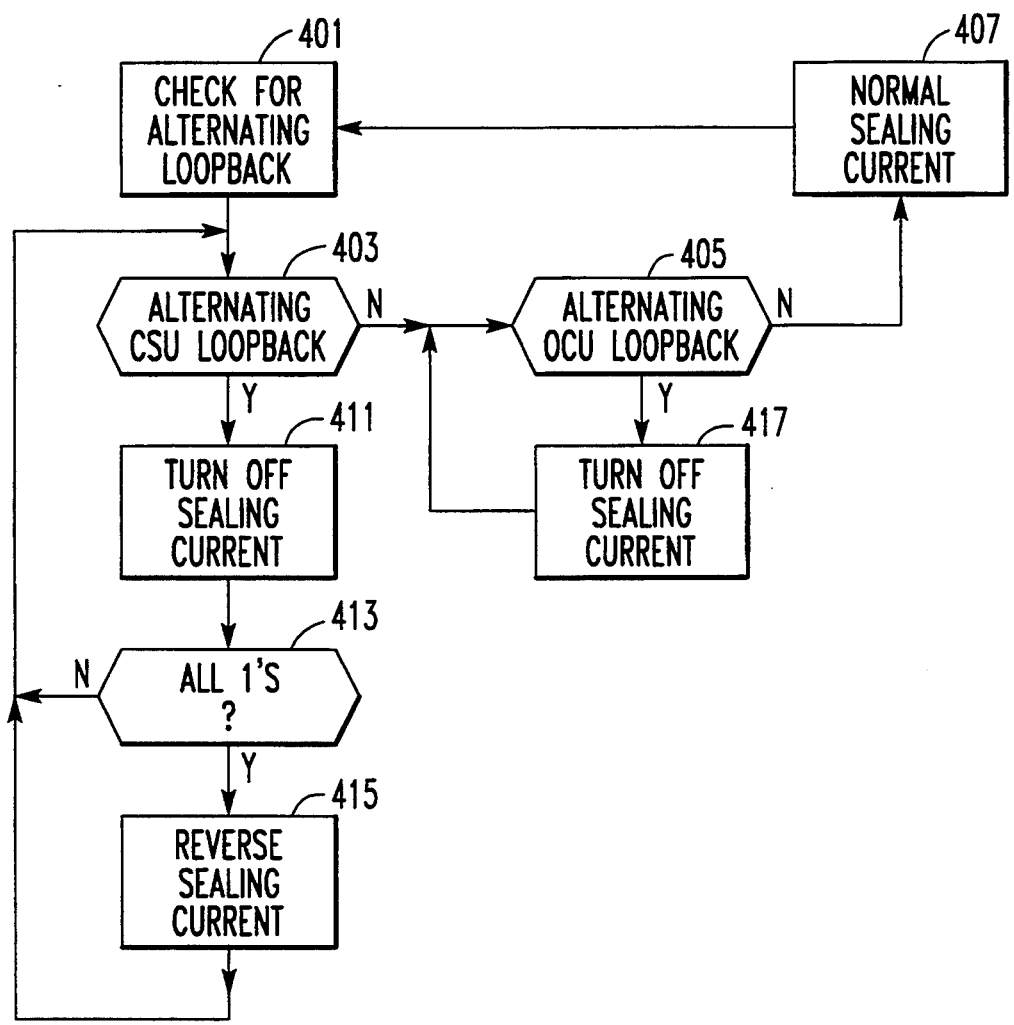
FIGS. 4 and 5 are respective flow charts detailing the digital command interpretation and relay control signal generation mechanism contained in the control firmware of the OCU DP of FIG. 1.

Referring now to FIG. 4, a first flowchart depicting the digital command processing sequence employed by the control processor 100 of OCU DP 10 for executing an alternating CSU or OCU loopback is shown as comprising a first status monitoring step 401, during which the processor checks all incoming command bytes for the presence of an alternating loopback action. At step 403, an inquiry is made as to whether the command is associated with an alternating CSU loopback. If the answer to step 403 is NO, the next query step 405 asks whether the command is associated with an alternating OCU loopback. If the answer to step 405 is NO, the normal flow of sealing current is maintained, as shown by step 407. Namely, processor 100 outputs control signals on links 18 and 19, which maintain relays 14 and 15 in the signal flow path states shown in FIG. 1, described above.

If the received command is representative of an alternating CSU loopback, the answer to step 403 is YES, and processor 100 complements the state of one of links 18 and 19, so that both sets of relay contacts 25, 26 of the sealing current control relays 14, 15 are connected to the same sealing current polarity terminal of sealing current generator 11, thereby turning off sealing current, as shown at step 411, and deactivating sealing current-responsive relay coil 35 in loopback unit 30, as described above. With relay coil deactivated a loopback path is provided at that point for test purposes.

Control processor 100 next looks for the presence of a prescribed command byte which serves to reverse the direction of sealing current flow, so the circuit path to the customer site may be reestablished and a loopback at the customer site effected. Such a byte may, for example, be an all 'ones' byte, as indicated in query step 413. If an all 'ones' byte is not detected, namely, the answer to step 413 is NO, the process flow returns to step 403. Once loopback testing at the site of relay coil has been completed, the test facility will send an all 'ones' byte, whereby the answer to step 413 becomes YES, causing control processor 100 to control the logical states of links 18 and 19 so as to cause the previous direction of sealing current flow to be reversed, as shown by step 415, thereby enabling testing of the customer's end of the loop. The process flow then returns to step 403.

Once the answer to step 403, either at the completion of an alternating CSU loopback or for no alternating CSU loopback, is NO, the process proceeds to step 405. In the case of an alternating OCU loopback, the answer to step 405 is YES. In this case, just as in the case of an alternating CSU loopback, described above, processor 100 also complements the state of one of links 18 and 19, as in step 411, so that both sets of relay contacts 25, 26 of the sealing current control relays 14, 15 are connected to the same sealing current polarity terminal of sealing current generator 11, thereby turning off sealing current, as shown at step 417, and deactivating relay coil 35 in loopback unit 30. The process flow then returns to step 405. Once an alternating OCU loopback test is complete, or if no alternating OCU is performed, the answer to query step 405 is NO, and normal sealing current is returned in step 407. For an alternating OCU loopback, only the OCU is tested, so that there is no further downlink loopback as in the case of an alternating CSU loopback which eventually effects a loopback at the customer site. Thus there is no monitoring for an all 'ones' byte, as in an alternating CSU loopback.

Figure 5:
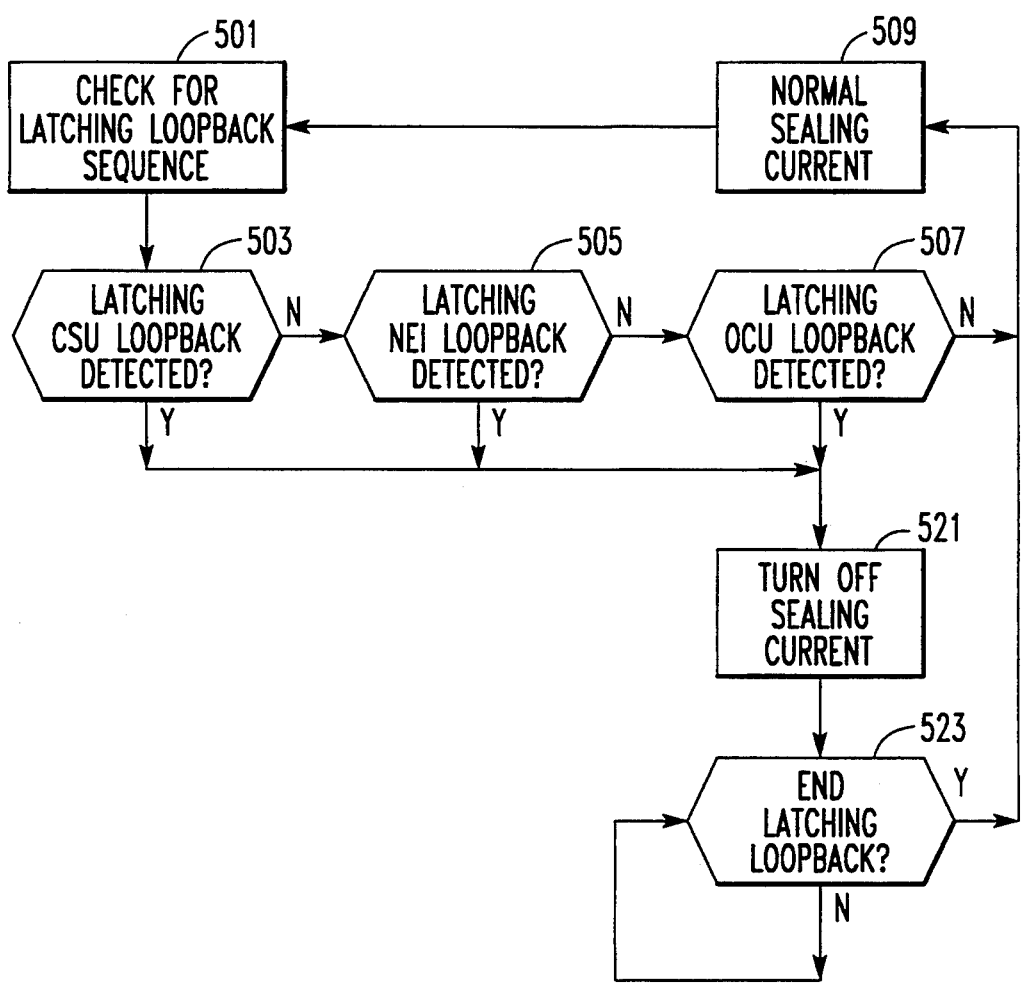

Referring now to FIG. 5, a second flowchart depicting the digital command processing sequence employed by the control processor 100 of OCU DP 10 for executing a latching CSU, OCU or NEI (network element interface) loopback is shown. (It should be noted that in the above-identified OCU DP model of the present example, its control firmware is defined such that the following sequences of control bytes are employed to establish latching loopback conditions: a minimum of a prescribed number (e.g. 35) transition-in-progress (TIP) bytes (X0111010); a minimum of a prescribed number (e.g. 35) loopback select code (LSC) bytes—(X1010101) for CSU loopback, (X0110001) for OSU loopback, and (X1000001) for NEI loopback; a minimum of a selected number (e.g. 100) loopback enable (LBE) bytes (X1010110); and a minimum of a prescribed number (e.g. 35) far end voice (FEV) bytes (X1011010) bytes. Also, to disable a latching loopback, a minimum of a prescribed number (e.g. 35) TIP bytes must be received by the OCU DP.

The process flow of FIG. 5 comprises a first status monitoring step 501, during which the processor checks all incoming command bytes for the presence of a latching loopback action. At step 503, an inquiry is made as to whether the command is associated with a latching CSU loopback. If the answer to step 503 is NO, the next query step 505 asks whether the command is associated with a latching NEI loopback. If the answer to latching NEI loopback query step 505 is NO, the process proceeds to query step 507 and inquires whether a latching OCU loopback has been detected. If the answer to latching OCU loopback query step 507 is NO, the normal flow of sealing current is maintained, as shown by step 509.

In the case of a latching CSU loopback, the answer to step 503 is YES, and the routine transitions to step 521, to turn off the sealing current. As described above, to turn off the flow of sealing current, processor 100 complements the state of one of links 18 and 19, whereby both sets of relay contacts 25, 26 of the sealing current control relays 14, 15 are connected to the same sealing current polarity terminal of sealing current generator 11, thereby turning off the sealing current, and deactivating relay coil 35 in loopback unit 30.

With sealing current turned off, the routine transitions from step 521 to query step 523 to determine whether the latching loopback is to be terminated. If the answer to step 523 is NO, the process flow self loops until the answer to step 523 is YES. It then transitions to step 509, so that processor 100 outputs control signals on links 18 and 19 to return relays 14 and 15 to the signal flow path states shown in FIG. 1, described above, for normal flow of sealing current.

If the answer to latching CSU loopback detection query step 503 is NO, but the answer to latching NEI loopback query step 505 is YES, the process transitions from step 505 to step 521 and proceeds to turn off sealing current and await and end of latching loopback, as described above for a latching CSU loopback. If the answers to both latching CSU detection query step 503 and latching NEI loopback query step 505 are NO, but the answer to latching OCU loopback is YES, the process transitions from step 507 to step 521 and proceeds to turn off sealing current, thereby deactivating relay coil 35 in loopback unit 30, as described above.

After turning off the flow of the sealing current in step 521, the routine transitions from step 521 to query step 523 to determine whether the latching loopback (here, a latching OCU loopback) is to be terminated. Again, if the answer to step 523 is NO, the process flow self loops until the answer to step 523 is YES. It then transitions to step 509, so that processor 100 outputs control signals on links 18 and 19 to return relays 14 and 15 to the signal flow path states for normal flow of sealing current.

As will be appreciated from the foregoing description, the previously described complexities associated with the conventional need to equip the DDST with the ability to perform interpretation of digital loopback commands are reduced in accordance with the invention by means of a relatively simple hardware modification of the four wire circuit connecting the office channel unit and the customer premises, and a relatively straightforward enhancement of the signal processing and test control firmware of the office channel unit equipment (OCU DP), thereby realizing a simplified circuit configuration for performing loopback testing of the four wire circuit.

Modifying the signal processing mechanism embodied within the OCU DP's firmware enables the OCU DP to interpret all test facility-sourced loopback commands, so that the (downstream) DDST is relieved of this burden, thereby considerably simplifying its signal processing functionality, the OCU DP effectively converting incoming digital test command patterns from the test facility into respective sealing current flow states. The hardware modification of the four wire circuit connecting the office channel unit and the customer premises involves the use of a sealing current-dependent relay circuit that responds to the sealing current flow states as converted by the OCU DP. The present invention is particularly useful in subscriber loop circuits that are less than 10,000 feet in length, whereby the need for additional amplifier and noise reduction components is obviated.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. For use with a telephone network having a first communication path for conveying digital communication signals from a network office site to a customer site, and a second communication path for conveying digital communication signals from said customer site to said network office site, an arrangement for providing a loopback path between said first and second communication paths, comprising:

a sealing current flow-dependent controllable switching circuit coupled with said first and second communication paths, and being operative, in accordance with flow of sealing current, to controllably provide either throughput connectivity for said first and second communication paths between said network office and customer sites, or to interrupt throughput connectivity of said first and second communication paths between said network office and customer sites and to couple said first communication path to said second communication path and thereby provide said loopback path from said first communication path to said second communication path; and a digital command decoding unit provided at said network office site and being operative to interpret digital loopback commands supplied from a test facility and, in response thereto, to controllably generate a first sealing current flow state control signal which causes said controlled switching circuit to interrupt said throughput connectivity of said first and second communication paths and to provide a loopback path therethrough, and a sealing current flow state second control signal, different from said first sealing current flow state control signal, which causes said controlled switching circuit to establish throughput connectivity of said first and second communication paths, and causes equipment at said customer site to provide a loopback path between said first and second communication paths at said customer site.

2. An arrangement according to claim 1, wherein said digital command decoding unit is provided in an office channel unit of said network office site and is operative to convert digital test loopback commands received from said test facility into said first and second sealing current flow states, respectively associated with said first and second sealing current flow state control signals.

3. An arrangement according to claim 2, wherein said first and second sealing current flow states, respectively, correspond to sealing current off and sealing current reversed.

4. An arrangement according to claim 3, wherein said controllable switching circuit comprises a sealing current-dependent relay circuit that is operative, in response to the flow of sealing current, to provide said connectivity of said first and second communication paths between said network office site and said customer site and, in response to the termination of the flow of sealing current, to interrupt said connectivity of said first and second communication paths between said network office site and said customer site, and to provide a loopback path.

5. An arrangement according to claim 3, wherein said a controllable switching circuit comprises a sealing current-dependent relay circuit that is operative, in response to the absence of the flow of sealing current, to interrupt said connectivity of said first and second communication paths between said network office site and said customer site, and instead loop a signal flow path back to said network office site.

6. An arrangement according to claim 2, wherein said digital command decoding unit is operative, in response to a digital test loopback command associated with a loopback test of said customer site, to generate said second control signal, which causes a reversal of the direction of sealing current flow and causes said controllable switching circuit to couple reversed sealing current to said customer site, in response to which reversed sealing current said throughput connectivity is re-established from said network office site to said customer site, and equipment at said customer site provides a loopback path between said first and second communication paths.

7. An arrangement according to claim 3, wherein said controllable switching circuit is operative to provide throughput connectivity for each of said first and second communication paths between said network office and customer sites in response to the flow of sealing current regardless of its direction of flow through said first and second communication paths.

8. An arrangement according to claim 7, wherein said controllable switching circuit is operative to interrupt said throughput connectivity of said first and second communication paths between said network office and customer sites and to provide said loopback path from said first communication path to said second communication path, in response to the interruption of the flow of sealing current through said one of said first and second communication paths for a period of time longer than a prescribed period of time.

9. An arrangement according to claim 8, wherein said controllable switching circuit is operative to re-establish said throughput connectivity of said first and second communication paths between said network office and customer sites, in response to the reapplication of sealing current through one of said first and second communication paths.

10. An arrangement according to claim 1, wherein said first communication path comprises a first telephone wire pair from said network office site to said customer site, and said second communication path comprises a second telephone wire pair from said customer site to said network office site, and wherein said controllable switching circuit comprises a relay circuit having a first set of relay contacts coupled in circuit with said first telephone wire pair, and a second set of relay contacts coupled in circuit with said second telephone wire pair, and further including a third telephone wire pair coupled between said first and second sets of relay contacts, and wherein said relay circuit is coupled to said one of said first and second telephone wire pairs and is operative, in response to the presence of sealing current flowing through said one of said first and second telephone wire pairs, to place said first and second sets of relay contacts into throughput connectivity positions for said first and second telephone wire pairs, respectively, between said network office and customer sites, and is operative, in response to the absence of the flow of sealing current through said one of said first and second telephone wire pairs, to switch said first and second sets of relay contacts from said throughput connectivity positions for said first and second telephone wire pairs to positions that interconnect said first and second telephone wire pairs through said third telephone wire pair and thereby provide a loopback path for said network office site through said first, third and second telephone wire pairs.

11. An arrangement according to claim 10, wherein said relay circuit includes a full wave rectifier circuit coupled in circuit with said one of said first and second telephone line pairs and a current limiting circuit coupled between said full wave rectifier circuit and a relay coil circuit, said relay coil circuit being operative, in response to said full wave rectifier detecting sealing current flow through said one of said first and second telephone line pairs, to provide said first connection through said first telephone line pair between said first and second sites, and said second connection through said second telephone line pair between said second and first sites.

12. An arrangement according to claim 11, further including a surge protection circuit coupled in circuit with said first and second telephone line pairs.

13. An arrangement according to claim 12, further including a Zener diode coupled in circuit with said relay coil so as to provide a path for excess sealing current and prevent over-driving said relay contacts.

14. An arrangement according to claim 13, wherein said current limit circuit is coupled in circuit with said relay coil and said Zener diode so as to protect said Zener diode against excess power dissipation.

15. For use with a telephone network having a first telephone line pair for transmitting communication signals, including digital data signals, from a first network site to a second network site, and a second telephone line pair for transmitting communication signals, including digital data signals, from said second network site to said first network site, an arrangement for providing a loopback path for said first network site through said first and second telephone line pairs, said arrangement comprising:

a controllable switching circuit coupled in circuit with each of said first and second telephone line pairs, and a third, auxiliary telephone line pair coupled to controllable switching circuit, said controllable switching circuit being operative, in response to the presence of sealing current of either a positive or negative polarity being applied to one of said first and second telephone line pairs, to provide connectivity through each of said first and second telephone line pairs between said first and second network sites, and being operative, in response to the absence of the flow of sealing current through said one of said first and second communication paths, to interrupt connectivity through said first and second telephone line pairs between said first and second network sites, and to couple said first and second telephone line pairs to said third telephone line pair, and thereby provide a loopback path for said first network site from said first telephone line pair to said second telephone line pair; and a digital command decoding unit provided at said first network site and being operative to interpret digital loopback commands supplied from a test facility and, in response thereto, controllably causing no sealing current to flow in at least one of said first and second telephone line pairs, and thereby causing said controlled switching circuit to provide a loopback path and to interrupt a communication path from said first network site to said second network site.

16. An arrangement according to claim 15, wherein said digital command decoding unit is operative to interpret a digital loopback command associated with a loopback at said second network site and to controllably cause sealing current to be applied in a reverse direction, in response to which said controlled switching circuit provides connectivity path through said first and second telephone line pairs from said first network site to said second network site and thereby couples said reverse sealing current to said second network site, and causes said second network site to provide a loopback path between said first and second telephone line pairs.

17. An arrangement according to claim 16, wherein said digital command decoding unit is provided in an office channel unit of said first network site and is operative to convert digital test loopback commands received from said test facility into respectively different sealing current flow states.

18. An arrangement according to claim 16, wherein said at least one of said first and second communication paths corresponds to said second communication path.

19. An arrangement according to claim 16, wherein said at least one of said first and second communication paths corresponds to either of said first and second communication paths.

20. An arrangement according to claim 15, wherein said controllable switching circuit is operative to interrupt connectivity through each of said first and second telephone line pairs between said first and second network sites, and to couple said first and second telephone line pairs to said third telephone line pair, and thereby provide a loopback path for said first network site from said first telephone line pair to said second telephone line pair, in response to the interruption of the flow of sealing current through said one of said first and second telephone line pairs for a period of time longer than a prescribed period of time.

21. An arrangement according to claim 20, wherein said controllable switching circuit is operative to reinstate said connectivity through each of said first and second telephone line pairs in response to the reapplication of sealing current through said one of said first and second communication telephone line pairs.

22. For use with a telephone network having a first communication path for conveying digital communication signals from a network office site to a customer site, and a second communication path for conveying digital communication signals from said customer site to said network office site, an arrangement for providing a loopback path between said first and second communication paths, comprising:
  a sealing current-responsive switching circuit coupled with said first and second communication paths, and being operative, in response to the application of sealing current thereto, to provide throughput connectivity for said first and second communication paths between said network office and customer sites and, in response to the termination of sealing current thereto, to interrupt said throughput connectivity between said network office and customer sites, and to couple said first communication path to said second communication path and thereby provide a loopback path from said first communication path to said second communication path; and
  an office channel unit provided at said network office site and being operative to normally cause the application of sealing current to said controlled switching circuit and, in response to a first digital command signal from said test facility, to controllably terminate the application of sealing current to said controlled switching circuit, so that said controlled switching circuit provides said loopback path.

23. An arrangement according to claim 22, wherein said office channel unit is further operative, in response to a second digital command signal, to controllably cause a reverse sealing current to be applied to said communication paths, in response to which said controlled switching circuit terminates said loopback path and reinstates connectivity by way of said first and second communication paths between said first and said second network sites.

24. An arrangement according to claim 22, wherein said first digital loopback command signal corresponds to one of an alternating office channel unit loopback and channel services unit loopback.

25. An arrangement according to claim 22, wherein said first digital loopback command signal corresponds to one of a latching office channel unit loopback, a latching channel services unit loopback, and a latching network element interface loopback.

26. An arrangement according to claim 23, wherein said second digital loopback command signal corresponds to an all ones code.

27. For use with a telephone network having a first communication path for conveying communication signals from a first network site to a second network site and a second communication path for conveying communication signals from said second network site to said first network site, a method for establishing a signalling loopback path for said first network site between said first and second communication paths, comprising the steps of:
  (a) coupling a controllable switching circuit with said first and second communication paths;
  (b) in response to the presence of sealing current flowing through one of said first and second communication paths, causing said controllable switching circuit to provide throughput connectivity for said first and second communication paths between said first and second network sites; and
  (c) in response to the absence of the flow of sealing current through said one of said first and second communication paths, causing said controllable switching circuit to interrupt throughput connectivity of said first and second communication paths between said first and second network sites and to couple said first communication path to said second communication path and thereby provide said loopback signalling path from said first communication path to said second communication path.

28. A method according to claim 27, wherein said one of said first and second communication paths corresponds to said second communication path.

29. A method according to claim 27, wherein said one of said first and second communication paths corresponds to either of said first and second communication paths.

30. A method according to claim 27, wherein step (b) comprises causing said controllable switching circuit to provide throughput connectivity for said first and second communication paths between said first and second network sites in response to the presence of sealing current regardless of its direction of current flow through said one of said first and second communication paths.

31. A method according to claim 30, wherein step (c) comprises causing said controllable switching circuit to interrupt said throughput connectivity for said first and second communication paths between said first and second network sites and to provide said loopback path from said first communication path to said second communication path, in response to the interruption of the flow of sealing current through one of said first and second communication paths for a period of time longer than a prescribed period of time.

32. A method according to claim 27, further comprising the step of (d) causing said controllable switching circuit to re-establish said throughput connectivity for said first and second communication paths between said first and second network sites, in response to the reapplication of sealing current through said one of said first and second communication paths.

33. For use with a telephone network having a first communication path for conveying digital communication signals from a network office site to a customer site, and a second communication path for conveying digital communication signals from said customer site to said network office site, a method of controlling the establishment of a loopback path between said first and second communication paths, comprising the steps of:
  (a) installing a sealing current-responsive switching circuit coupled with said first and second communication paths, said sealing current-responsive switching circuit being operative, in response to the application of sealing current thereto, to provide throughput connectivity for said first and second communication paths between said network office and customer sites and, in response to the termination of sealing current thereto, to interrupt said throughput connectivity between said network office and customer sites, and to couple said first communication path to said second communication path and thereby provide a loopback path from said first communication path to said second communication path;

(b) from said network office site, causing sealing current to be applied to said controlled switching circuit, and thereby provide throughput connectivity for said first and second communication paths between said network office and customer sites, and, in response to a first digital command signal from a test facility, controllably terminating the application of sealing current to said controlled switching circuit, so that said controlled switching circuit provides said loopback path.

34. A method according to claim 33, wherein step (b) further comprises, in response to a second digital command signal from said test facility, controllably causing a reverse sealing current to be applied to said communication paths, in response to which said controlled switching circuit terminates said loopback path and reinstates connectivity by way of said first and second communication paths between said first and said second network sites.

35. A method according to claim 33, wherein said first digital loopback command signal corresponds to one of an alternating office channel unit loopback and channel services unit loopback.

36. A method according to claim 33, wherein said first digital loopback command signal corresponds to one of a latching office channel unit loopback, a latching channel services unit loopback, and a latching network element interface loopback.

37. A method according to claim 34, wherein said second digital loopback command signal corresponds to an all ones code.

38. For use with a telephone network having a first telephone line pair for transmitting communication signals, including digital data signals, from a first network site to a second network site, and a second telephone line pair for transmitting communication signals, including digital data signals, from said second network site to said first network site, a method for providing a loopback path for said first network site through said first and second telephone line pairs, said method comprising the steps of:

(a) providing a controllable switching circuit in circuit with each of said first and second telephone line pairs, said controllable switching circuit being operative, in a first controlled state thereof, to provide connectivity through each of said first and second telephone line pairs between said first and second network sites, and being operative, in a second controlled state thereof, to interrupt connectivity through said first and second telephone line pairs between said first and second network sites, and to provide a loopback path between said first and second telephone line pairs for said first network site;

(b) at said first network site, receiving digital loopback command signals supplied from a test facility, and converting said digital loopback command signals into respective control signals representative of connectivity and loopback states of said telephone line pairs; and (c) applying said control signals to said controllable switching circuit, so as to selectively place said controllable switching circuit in said second controlled state in response to decoding a first prescribed digital command signal supplied from said test facility, and so as to selectively place said controllable switching circuit in said first controlled state in response to decoding a second prescribed digital command signal supplied from said test facility; and wherein said controlled switching circuit is configured to be placed in said controlled states thereof in dependence upon respective sealing current flow states applied thereto, and wherein step (b) is performed in an office channel unit of said first network site and is operative to convert digital test loopback command signals received from said test facility into respectively different sealing current flow states.

39. A method according to claim 38, wherein step (b) comprises, in response to a digital loopback command signal associated with a loopback at said second network site, causing sealing current to be applied to said telephone line pairs in a reverse direction, in response to which said controlled switching circuit provides connectivity path through said first and second telephone line pairs from said first network site to said second network site and thereby couples said reverse sealing current to said second network site, and causes said second network site to provide a loopback path between said first and second telephone line pairs.

* * * * *